Patented Feb. 8, 1944

2,341,276

UNITED STATES PATENT OFFICE 2,341,276

CATALYTIC TREATMENT OF HYDROCARBONS

Elmer R. Kanhofer, Chicago, Ill., assignor to Universal Oil Products Company, Chicago, Ill., a corporation of Delaware No Drawing. Application July 26, 1940,
Serial No. 347,753

20 Claims. (Cl. 196—52)

This application is a continuation-in-part of my application Serial No. 330,952, filed April 22, 1940.

This invention relates to a process for the conversion of hydrocarbons such as petroleum fractions and hydrocarbon oils generally in the presence of finely divided catalysts to produce substantial yields of hydrocarbons distilling within the gasoline boiling range and having high antiknock value. The process may be applied to conversions involving low boiling as well as higher boiling hydrocarbons whether they are of natural or synthetic origin, or are produced as for example from primary distillate resulting from the destructive distillation of hydrocarbon-containing materials such as coals, lignites and shales.

The present invention provides a process for converting hydrocarbon oil in a relatively simple manner while in the presence of catalyst powder. In the more conventional catalytic processes hydrocarbon oils are converted while in contact with granular catalysts disposed as beds in reaction chambers. A plurality of reaction chambers are provided so as to permit continuous operation, one or more chambers being in process while one or more are in regeneration. When cracking with catalyst powder, only a single reaction chamber may be employed and the catalyst may be regenerated outside the reaction zone. The invention is further characterized by the use of catalysts specially adapted to the process. These catalysts are produced synthetically and in a finely divided condition. They are more effective than synthetic catalysts of similar composition which may be prepared in a gel condition, and subsequently dried and reduced to the powdered form.

In one specific embodiment the present invention comprises admixing a synthetic cracking catalyst powder, which has been precipitated in a finely divided condition, with hydrocarbon oil and subjecting the mixture to conditions of time, temperature and pressure adequate to produce large yields of high antiknock gasoline, subsequently separating spent catalyst from the reaction products, regenerating the catalyst, and fractionating vaporous products to separate high boiling hydrocarbon oil above the gasoline boiling point range, said high antiknock gasoline and gaseous products.

In a further embodiment high boiling hydrocarbons above the gasoline boiling point range are commingled with hydrocarbon oil and catalyst mixture admitted to the process for the production of further yields of said high antiknock gasoline.

According to the present invention, hydrocarbon oils preferably those of a distillate character and vaporizable without substantial decomposition, are catalytically cracked in the presence of hydrous oxide catalysts which are precipitated in a very finely divided form and maintained in a fine state of subdivision for processing with the hydrocarbon oil. The hydrous oxides employed are preferably composites of hydrated silica with alumina or zirconia, the hydrated silicon dioxide constituting the major proportion of the catalyst composition while the remaining components are present in minor proportions. The catalyst is prepared in a finely divided rather than in the usual gel condition by precipitating, for example, a hydrated silica under definitely controlled conditions in the presence of a suitable added substance. A relatively highly dispersed precipitate nearly of colloidal dimensions is thus produced which is composited with the remaining hydrated oxides and yields a catalyst which is more effective in the present process than catalysts of corresponding composition prepared from gels or gelatinous precipitates.

In the preparation of the finely divided precipitates the various substances which may be present in the solution to effect the desired precipitation may be of a number of different types which however are not equivalent in the effects produced, nor in the concentration and manner in which they are used. Although all alkali metal and soluble alkaline earth salts do not necessarily function in the desired manner, it may be generally stated that a large number of salts of these metals with both weak and strong acids exhibit the desired precipitation effect. In the preparation of hydrated silica from water-glass solutions by the addition of hydrochloric acid for example, the proper addition of sodium chloride gives a precipitated catalyst of the desired character. The anions of the alkali metal and/or ammonium salts which may be used may constitute the halides, the sulfates, the nitrates, the carbonates, the phosphates, and the acetates, the citrates, oxalates, or other organic acid ions. Organic substances or compounds may also be added under selected conditions either in addition to, or in some specific cases separately from the inorganic or mixed salts. Thus, miscible solvents may be added such as alcohols, ketones, or other organic substances.

Various methods may be employed in compositing the hydrous oxides used in the catalytic processing according to the present invention depending upon the particular use and the extent to which the catalyst is employed. According to one general method, a finely divided hydrated silica may be prepared by diluting an alkali metal silicate such as a commercial grade of water glass with approximately 3 to 10 times its volume of a solution wherein an added amount of substance giving rise to the formation of finely divided hydrated silica is disposed in the proper concentration prior to the precipitation of the finely divided siliceous material. According to this method as a specific example, a definite amount of sodium chloride may be used for a particular dilution and kind of water-glass employed, and acid gradually added while thoroughly agitating in an amount sufficient to produce the finely divided hydrated silica. It is necessary even where the proper amount of the added substance is present to thoroughly mix the reactants in streams or by agitation, and to employ times of 5 to 20 minutes or more depending upon the size of batch, mixing conditions, etc. As a specific example of compositing the hydrous oxides, the finely divided hydrated silica prepared in this manner may be admixed while still in suspension with a solution of a salt of the metal for which a hydrated oxide is to be precipitated in the presence of the finely divided hydrated silica, and an alkaline precipitate added to precipitate the hydrous oxide. The primary hydrated silica may however be filtered and separated from the salt solution which is present, further washed and purified if desired, and may then be composited with the remaining hydrous oxide components. Thus a finely divided hydrated silica may be precipitated, filtered, and washed to remove alkali metal impurities by methods which will be subsequently described, and the purified hydrated silica then dispersed in a solution containing aluminum chloride for example, and hydrated alumina precipitated in the presence of the finely divided hydrated silica by the addition of ammonium hydroxide.

According to another procedure, a solution of a soluble silicon compound may be mixed with a solution of a metal compound whose hydrous oxide is to be coprecipitated with a hydrated silica while mixing in the added substance to promote formation of the finely divided precipitate with either or both of the reactants, and adjusting the hydrogen ion concentration of the reactants or reaction mixture depending in large measure upon the proportions and character of the added substance. In this case also, the very finely divided precipitate may be formed as a fine suspension distributed through the liquid if proper conditions of concenerations, mixing, dilution and pH conditions are observed. Various coprecipitation procedures are possible depending upon whether silicates are used or silicon salts.

In the composites of hydrous oxides with hydrated silica, approximately 5-30% of the hydrated oxides is preferably composited with the hydrated silicon dioxide. Smaller and higher proportions may, however, be utilized but generally speaking without the same catalytic effectiveness. Thus, 5 to 30% of hydrated alumina may be composited with hydrated silica, or several mols of alumina and 5 to 10 mols. of zirconia for example, may be composited with 100 mols. of the specially precipitated silicon dioxide. The precipitates or composites are filtered in any convenient form of filtration apparatus and the filter cake may be carefully washed free from impurities if it is desired to produce it in a highly active and stable form so as to permit repeated use and regeneration thereof. This treatment which consists particularly of the removal of alkali metal impurities may be accomplished by more or less prolonged washing with various acidic and salt solutions. Water acidulated with strong acids for example or solutions of strong acid salts of ammonium or metals corresponding to those of the added metal oxides for example, may be suitable and the material may be purified before or after a drying treatment. These purification washes may be carried out as has been indicated prior to compositing of the specially prepared hydrated silica with the remaining hydrous oxides. The composited material may be finally dried at a temperature of 200-250° F., more or less.

The finely divided powder prepared according to the above procedures may have a particle size of the order of 1 to 10 microns and is particularly suitable for admixing with hydrocarbon oil according to the present process and cracking to produce large yields of high anti-knock gasoline. The kind of powdered catalyst used is not restricted to any single preparation procedure since various types of oil cracking may be carried out in the presence of the catalyst powder. In the cracking of a relatively heavy oil where in some cases it may not be desired to recover the catalyst, it may not be necessary to purify or even thoroughly dry the powdered catalyst. On the other hand, in many operations it may be desirable to use a highly stable form of catalyst which is to be separated from residual and carbonaceous deposits and repeatedly regenerated. In this type of operation powdered catalyst may be separated from the oil by various procedures and the separated spent catalyst regenerated by removing hydrocarbonaceous deposits as by solvent treatment and/or heating in the presence of air for example to remove said deposits whereupon it is used again either alone or in admixture with fresh catalyst in suspension in the hydrocarbon oil undergoing catalytic cracking.

Various types of hydrocarbon conversion reactions take place in the presence of the powdered catalyst depending partly upon the temperature, pressure and time conditions and partly upon the nature of the hydrocarbon oil processed. These reactions may include carbon to carbon cleavage, isomerization, cyclization, dehydrogenation, hydrogenation, and desulfurization reactions. In the case of higher boiling hydrocarbons for example there may be a cleavage of long chained carbon to carbon bonds and isomerization reactions may also occur whereby the lower boiling hydrocarbons formed tend to become more highly branch chained. Also hydroaromatic hydrocarbons present in the oil undergoing decomposition or formed therein by cyclization of olefins may undergo dehydrogenation to form aromatic hydrocarbons, and hydrogen liberated in these reactions may combine with olefins present during reaction to form paraffinic hydrocarbons. The latter reactions tend to occur at the lower temperatures given in the range of operating conditions whereas more unsaturated hydrocarbons, particularly olefins, are produced in large proportions at the higher temperatures employed. The hydrocarbons generally are of a more branched chain structure than is produced in thermal cracking treatment. The temperatures employed may be within the approximate range of 700-1150° F. more or less, and the pressures employed may range from approximately atmospheric to 300 pounds or more per square inch.

The following specific examples are given to illustrate specific applications of the process of the invention, the method of the catalyst preparation also being indicated. The invention should not be considered as limited to these examples of the process or to the particular catalyst preparation since these are given as illustrations of the novelty and utility of the invention.

Silica-alumina catalyst powders employed may be prepared according to the following procedures.

A commercial sample of water-glass of approximately 41° Baumé gravity and containing approximately 28.5% $SiO_2$ and 8.9% $Na_2O$ is diluted approximately 10 times with water containing dissolved sodium chloride in an amount equal to approximately ½ of the weight of the water glass. Hydrochloric acid is added to the water glass-sodium chloride solution while agitating thoroughly and a very finely divided precipitate begins to form and remains in suspension in the alkaline solution. The addition of acid is continued until there is an excess of acid, the pH being approximately 3. The excess acid may then be substantially neutralized by the addition of ammonium hydroxide whereby hydrated silica is practically all precipitated. The suspension of hydrated silica is then mixed with an aluminum chloride solution and hydrated alumina precipitated in the presence of the suspended finely divided hydrated silica by the addition of ammonium hydroxide. The composite precipitate is then filtered and the filter cake washed with water acidulated with hydrochloric acid until the precipitate is substantially free from sodium as indicated by a magnesium uranyl acetate test. The purified precipitate is then dried at approximately 200–250° F. and the dried material contains approximately 10–20% moisture. The dried material readily breaks up into a very finely divided powder which is mixed with the hydrocarbon oil for cracking according to the present process. The catalyst is also prepared in a similar manner except that the precipitated hydrated silica is filtered and washed substantially free from sodium chloride before mixing as a suspension with the aluminum chloride for precipitation of the hydrated alumina.

In another procedure hydrated silica in finely divided form is precipitated similarly as illustrated above and the finely divided precipitate is filtered and washed with acidulated water to substantially remove alkali metal impurities as indicated by the magnesium uranyl acetate test. The purified hydrated silica is then suspended in a dilute solution of aluminum chloride and hydrated alumina precipitated in the presence of the finely divided hydrated silica by the addition of ammonium hydroxide. The composite precipitate is filtered and water washed, and the filter cake is dried at a temperature of approximately 200–250° F. The dried product has a moisture content of approximately 10–20%.

These catalysts have a particle size of approximately 2½ to 5 microns and by activity tests are approximately three times as effective on a weight basis as catalyst powder produced by pulverizing corresponding materials prepared in the gel condition.

Silica-alumina catalyst in finely divided form when prepared according to the above procedures and admixed in the proportion of approximately one per cent with a Pennsylvania distillate oil of approximately 35° A. P. I. gravity gives a yield of 27.4 volume per cent of 400° F. end-point gasoline of 76.5 octane number in a once-through operation when heating to a temperature of approximately 1000° F. with a reaction chamber temperature of approximately 800° F. and a pressure of 55 pounds per square inch. In a recycle operation where partly converted hydrocarbons of high boiling point range are recycled in admixture with further amounts of catalyst powder a yield of approximately 65% of 78 octane number may be otbained.

I claim as my invention:

1. A process for the catalytic conversion of hydrocarbon oil to produce high antiknock gasoline which comprises cracking said hydrocarbon oil in contact with a finely divided catalyst consisting of a partially dehydrated mixture of an activated hydrous oxide and hydrated silica precipitated in a finely divided condition by acidification of a solution containing a soluble silicate and a soluble inorganic salt selected from the group consisting of the alkali and alkaline earth metal salts.

2. A process for the catalytic conversion of hydrocarbon oil to produce high antiknock gasoline which comprises cracking said hydrocarbon oil in contact with a finely divided catalyst consisting of a partially dehydrated alkali-free mixture of alumina and hydrated silica precipitated in a finely divided condition by acidification of a solution containing a soluble silicate and a soluble inorganic salt selected from the group consisting of the alkali and alkaline earth metal salts.

3. A process for the catalytic conversion of hydrocarbon oil to produce high antiknock gasoline which comprises cracking said hydrocarbon oil in contact with a finely divided catalyst consisting of a partially dehydrated alkali-free mixture of zirconia and hydrated silica precipitated in a finely divided condition by acidification of a solution containing a soluble silicate and a soluble inorganic salt selected from the group consisting of the alkali and alkaline earth metal salts.

4. A process for the catalytic conversion of hydrocarbon oil to produce high antiknock gasoline which comprises cracking said hydrocarbon oil in contact with a finely divided catalyst having a particle size of approximately 1 to 10 microns and consisting of a partially dehydrated mixture of an activating hydrous oxide and hydrated silica precipitated in a finely divided condition by acidification of a solution containing a soluble silicate and a soluble inorganic salt selected from the group consisting of the alkali and alkaline earth metal salts.

5. A process for the catalytic conversion of hydrocarbon oil to produce high antiknock gasoline which comprises cracking said hydrocarbon oil at a temperature of about 700° to about 1150° F. at a pressure of approximately atmospheric to about 300 pounds per square inch in contact with a finely divided catalyst consisting of a partially dehydrated mixture of an activating hydrous oxide and hydrated silica precipitated in a finely divided condition by acidification of a solution containing a soluble silicate and a soluble inorganic salt selected from the group consisting of the alkali and alkaline earth metal salts.

6. A process for the catalytic conversion of hydrocarbon oil to produce high antiknock gasoline which comprises subjecting said hydrocarbon oil to contact with a finely divided catalyst prepared by commingling an activating oxide with hydrated silica precipitated in a finely divided condition by acidification of a solution containing a soluble silicate and a soluble inorganic salt selected from the group consisting of the alkali and alkaline earth metal salts.

7. A process for the catalytic conversion of hydrocarbon oil to produce high antiknock gasoline which comprises cracking said hydrocarbon oil in contact with a finely divided catalyst prepared by commingling alumina with an alkali metal-free hydrated silica precipitated in a finely divided condition by acidification of a solution containing a soluble silicate and a soluble inorganic salt selected from the group consisting of the alkali and alkaline earth metal salts.

8. A process for the catalytic conversion of hydrocarbon oil to produce high antiknock gasoline which comprises cracking said hydrocarbon oil in contact with finely divided catalyst prepared by commingling zirconia with an alkali metal-free hydrated silica precipitated in a finely divided condition by acidification of a solution containing a soluble silicate and a soluble inorganic salt selected from the group consisting of the alkali and alkaline earth metal salts.

9. A process for the catalytic conversion of hydrocarbon oil to produce high antiknock gasoline which comprises cracking said hydrocarbon oil in contact with a finely divided catalyst prepared by precipitating finely divided hydrated silica from a sodium silicate solution by the acidification thereof in the presence of an added sodium salt, suspending said finely divided hydrated silica in a solution of an aluminum salt and precipitating hydrated alumina in the presence of said finely divided hydrated silica.

10. A process for the catalytic conversion of hydrocarbon oil to produce high antiknock gasoline which comprises cracking said hydrocarbon oil in contact with a finely divided catalyst prepared by precipitating finely divided hydrated silica from a sodium silicate solution by the acidification thereof in the presence of an added sodium salt, suspending said finely divided hydrated silica in a solution of an aluminum salt, precipitating hydrated alumina in the present of said finely divided hydrated silica, and purifying the product to substantially remove alkali metal impurities.

11. A process for the catalytic conversion of hydrocarbon oil to produce high antiknock gasoline which comprises cracking said hydrocarbon oil in contact with a finely divided catalyst prepared by precipitating finely divided hydrated silica from a sodium silicate solution by the acidification thereof in the presence of added sodium chloride, purifying said finely divided precipitated hydrated silica to substantially remove alkali metal impurities, suspending the purified hydrated silica in a solution of an aluminum salt and precipitating hydrated alumina in the presence of said hydrated silica by the addition of an ammonium base.

12. A process for the catalytic conversion of hydrocarbon oil to produce high antiknock gasoline which comprises cracking said hydrocarbon oil in contact with a finely divided catalyst prepared by precipitating finely divided hydrated silica from a sodium silicate solution by the acidification thereof in the presence of added sodium chloride, purifying said finely divided precipated hydrated silica to substantially remove alkali metal impurities, suspending the purified hydrated silica in a solution of a zirconium salt and precipitating hydrated zirconia in the presence of said hydrated silica by the addition of an ammonium base.

13. A conversion process which comprises subjecting hydrocarbon oil to catalytic cracking conditions in the presence of a cracking catalyst in powdery form and containing silica which has been precipitated as a non-gelatinous finely divided hydrate by acidification of a solution containing a soluble silicate and a soluble inorganic salt selected from the group consisting of the alkali and alkaline earth metal salts.

14. A conversion process which comprises subjecting hydrocarbon oil to catalytic cracking conditions in the presence of a cracking catalyst in powdery form and containing silica which has been precipitated as a non-gelatinous finely divided hydrate by acidification of a solution containing a soluble silicate and a soluble inorganic salt selected from the group consisting of the alkali and alkaline earth metal salts, the hydrated silica having a particle size of about 1 to 10 microns.

15. A conversion process which comprises subjecting hydrocarbon oil to catalytic cracking conditions in the presence of a powdery mixture of silica and alumina, the silica having been precipitated as a non-gelatinous finely divided hydrate by acidification of a solution containing a soluble silicate and a soluble inorganic salt selected from the group consisting of the alkali and alkaline earth metal salts.

16. A conversion process which comprises subjecting hydrocarbon oil to catalytic cracking conditions in the presence of a powdery mixture of silica and zirconia, the silica having been precipitated as a non-gelatinous finely divided hydrate by acidification of a solution containing a soluble silicate and a soluble inorganic salt selected from the group consisting of the alkali and alkaline earth metal salts.

17. A conversion process which comprises subjecting hydrocarbon oil to catalytic cracking conditions in the presence of a powdery mixture of silica and alumina, the silica having been precipitated as a non-gelatinous finely divided hydrate by acidification of a solution containing a soluble silicate and a soluble inorganic salt selected from the group consisting of the alkali and alkaline earth metal salts, the hydrated silica having a particle size of about 1 to 10 microns.

18. A conversion process which comprises subjecting hydrocarbon oil to catalytic cracking conditions in the presence of a powdery mixture of silica and zirconia, the silica having been precipitated as a non-gelatinous finely divided hydrate by acidification of a solution containing a soluble silicate and a soluble inorganic salt selected from the group consisting of the alkali and alkaline earth metal salts, the hydrated silica having a particle size of about 1 to 10 microns.

19. A conversion process which comprises subjecting hydrocarbon oil to catalytic cracking conditions in the presence of a powdery mixture of silica, alumina and zirconia, the silica having been precipitated as a non-gelatinous finely divided hydrate by acidification of a solution containing a soluble silicate and a soluble inorganic salt selected from the group consisting of the alkali and alkaline earth metal salts.

20. A conversion process which comprises subjecting hydrocarbon oil to catalytic cracking conditions in the presence of a powdery mixture of silica, alumina and zirconia, the silica having been precipitated as a non-gelatinous finely divided hydrate by acidification of a solution containing a soluble silicate and sodium chloride.

ELMER R. KANHOFER.